United States Patent
Leise et al.

(10) Patent No.: US 11,182,868 B1
(45) Date of Patent: *Nov. 23, 2021

(54) METHOD AND SYSTEM FOR GENERATING AN AUTOMATED POLICE REPORT

(71) Applicant: STATE FARM MUTUAL AUTOMOBILE INSURANCE COMPANY, Bloomington, IL (US)

(72) Inventors: William J. Leise, Normal, IL (US); Douglas Albert Graff, Mountain View, MO (US); Christina P. Mullen, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,195

(22) Filed: May 6, 2020

Related U.S. Application Data

(63) Continuation of application No. 15/206,885, filed on Jul. 11, 2016, now Pat. No. 10,685,414.

(51) Int. Cl.
*G06Q 40/08* (2012.01)
*G06Q 50/26* (2012.01)

(52) U.S. Cl.
CPC .......... *G06Q 50/265* (2013.01); *G06Q 40/08* (2013.01)

(58) Field of Classification Search
None
See application file for complete search history.

(56) References Cited

U.S. PATENT DOCUMENTS

| | | | |
|---|---|---|---|
| 7,804,982 B2 * | 9/2010 | Howard | G07C 9/253 382/115 |
| 8,600,098 B2 | 12/2013 | Sampedro Diaz et al. | |
| 9,697,733 B1 * | 7/2017 | Penilla | G06Q 50/06 |
| 10,043,218 B1 * | 8/2018 | Sabbah | G06Q 40/00 |
| 2008/0033757 A1 * | 2/2008 | Kozloff | G16H 10/20 705/2 |

(Continued)

OTHER PUBLICATIONS

Notice of Allowance for U.S. Appl. No. 15/206,885 dated Feb. 20, 2020.

(Continued)

*Primary Examiner* — William J Jacob
(74) *Attorney, Agent, or Firm* — Marshall, Gerstein & Borun LLP; Randall G. Rueth

(57) ABSTRACT

The present disclosure generally relates to generating an automated police report after an accident. For example, a police officer may scan in an insurance card barcode, a VIN barcode, a driver's license number, etc., to populate fields of the automated police report. The automated police report may also include telematics data from an associated vehicle to determine an impact of a collision, a time and location of the collision, etc. A scene of the accident may also be reconstructed using satellite images and/or video taken at the time of the accident. For example, the scene may be reconstructed based on image sensors on the vehicle, weather data at the time of the collision, data communicated vehicle-to-vehicle from another vehicle, telematics data, etc. Images of the reconstructed scene and/or images of the actual scene from the satellite video may be included in the automated police report.

18 Claims, 5 Drawing Sheets

(56) References Cited

U.S. PATENT DOCUMENTS

| | | | | |
|---|---|---|---|---|
| 2010/0248681 A1* | 9/2010 | Phills | .................... | H04L 67/04 |
| | | | | 455/404.2 |
| 2012/0123806 A1* | 5/2012 | Schumann, Jr. | ....... | G06Q 40/08 |
| | | | | 705/4 |
| 2013/0222133 A1* | 8/2013 | Schultz | ................ | H04W 4/021 |
| | | | | 340/539.13 |
| 2013/0246041 A1* | 9/2013 | Costa | .................... | G06F 40/58 |
| | | | | 704/2 |
| 2013/0254133 A1* | 9/2013 | Connell | ................ | G06Q 10/10 |
| | | | | 705/342 |
| 2014/0058730 A1* | 2/2014 | Costa | .................... | G06Q 10/06 |
| | | | | 704/235 |
| 2014/0354402 A1* | 12/2014 | Joao | ....................... | H04L 63/08 |
| | | | | 340/5.52 |

OTHER PUBLICATIONS

Non-Final Office Action for U.S. Appl. No. 15/206,885 dated Oct. 3, 2019.

Final Office Action for U.S. Appl. No. 15/206,885 dated Jun. 20, 2019.

Non-Final Office Action for U.S. Appl. No. 15/206,885 dated Oct. 18, 2018.

\* cited by examiner

METHOD AND SYSTEM FOR GENERATING AN AUTOMATED POLICE REPORT

CROSS REFERENCE TO RELATED APPLICATION

The present application is a continuation of U.S. patent application Ser. No. 15/206,885, entitled METHOD AND SYSTEM FOR GENERATING AN AUTOMATED POLICE REPORT, filed Jul. 11, 2016, the disclosure of which is incorporated herein in its entirety by reference.

TECHNICAL FIELD

The present disclosure generally relates to methods and systems to automatically generate police reports. More particularly, the present disclosure relates to automatically generating a police report, in regard to vehicle accidents, based on data representative of a vehicle insurance policy, data representative of a vehicle, data representative of a vehicle operator, vehicle telematics data and/or data representative of an accident scene.

BACKGROUND

As part of their duties, police officers are often required to generate reports related to accidents that involve vehicles (i.e., police reports). Often times, these police reports include insurance related information, vehicle information, vehicle driver information, and accident scene information. Manual generation of police reports is time consuming. The police reports are typically based on information obtained manually by a police officer. Accordingly, these reports are prone to errors and, often times, do not include all the desired information.

Additionally, insurance companies often use police reports as a part of related insurance claim processes. Generally, there is a delay associated with the ability of insurance companies to obtain police reports.

Accordingly, there are deficiencies associated with existing systems and methods for generating and obtaining police reports, such as drawbacks related to timeliness, completeness, and accuracy.

SUMMARY

Systems and methods are provided for automatically generating police reports. The systems and methods may reduce police report generation time, errors associated with generating police reports, and may increase accuracy of the associated police reports.

In one aspect, a device for automatically generating a police report may include an insurance policy data receiving module stored on a memory that, when executed by a processor of a computing device, causes the processor to receive insurance policy data. The insurance policy data may be representative of a vehicle insurance policy. The device may also include a vehicle identification data receiving module stored on a memory that, when executed by a processor of a computing device, causes the processor to receive vehicle identification data. The vehicle identification data may be representative of at least one vehicle. The device may further include a vehicle driver identification data receiving module stored on a memory that, when executed by a processor of a computing device, causes the processor to receive vehicle driver identification data. The vehicle driver identification data may be representative of a vehicle driver. The device may yet further include a police report data generation module stored on a memory that, when executed by a processor of a computing device, causes the processor to automatically generate police report data, based upon the insurance policy data, the vehicle identification data, and the vehicle driver identification data.

In another aspect, a computer implemented method for automatically generating a police report may include receiving insurance policy data, at a processor of a computing device, in response to the processor executing an insurance policy data receiving module. The insurance policy data may be representative of a vehicle insurance policy. The method may also include receiving vehicle identification data, at a processor of a computing device, in response to the processor executing a vehicle identification data receiving module. The vehicle identification data may be representative of at least one vehicle. The method may further include receiving vehicle driver identification data, at a processor of a computing device, in response to the processor executing a vehicle driver identification data receiving module. The vehicle driver identification data is representative of a vehicle driver. The method may yet further include automatically generating police report data, using a processor of a computing device, based upon the insurance policy data, the vehicle identification data, and the vehicle driver identification data, in response to the processor executing a police report data generation module.

In a further aspect, a non-transitory computer-readable medium storing instructions that, when executed by a processor of a computing device, causes the processor to automatically generate police report data may include an insurance policy data receiving module that, when executed by a processor of a computing device, causes the processor to receive insurance policy data. The insurance policy data may be representative of a vehicle insurance policy. The non-transitory computer-readable medium may also include a vehicle identification data receiving module that, when executed by a processor of a computing device, causes the processor to receive vehicle identification data. The vehicle identification data may be representative of at least one vehicle. The non-transitory computer-readable medium may further include a vehicle driver identification data receiving module that, when executed by a processor of a computing device, causes the processor to receive vehicle driver identification data. The vehicle driver identification data may be representative of a vehicle driver. The non-transitory computer-readable medium may yet further include a police report data generation module that, when executed by a processor of a computing device, causes the processor to automatically generate police report data, based upon the insurance policy data, the vehicle identification data, and the vehicle driver identification data.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present disclosure generally relates to generating an automated police report after an accident. For example, a police officer may scan in an insurance card barcode, a VIN barcode, a driver's license number, etc., to populate fields of the automated police report. The automated police report may also include telematics data from an associated vehicle to determine an impact of a collision, a time and location of the collision, etc. A scene of the accident may also be reconstructed using satellite images and/or video taken at the time of the accident. For example, the scene may be reconstructed based on image sensors on the vehicle, weather data at the time of the collision, data communicated vehicle-to-vehicle from another vehicle, telematics data, etc. Images of the reconstructed scene and/or images of the actual scene from the satellite video may be included in the automated police report.

By automatically generating police report data, and associated police reports, the systems and methods of the present disclosure reduce computer memory requirements and computer processing requirements. Additionally, the systems and methods improve accuracy and availability of police reports.

While the systems and methods of the present disclosure may generate and transmit insurance policy related data, that is representative of personal information and individual insurance information, the systems and methods may include an "opt-in" feature that enables any given individual to select content of any insurance policy related data. Furthermore, the systems and methods may automatically exclude all personal information and individual insurance policy information from the insurance policy related data. For example, the systems and methods may generate insurance policy related data that only includes an indication as to whether any given vehicle is equipped with an automatic police report generation device.

In certain aspects, the present embodiment may provide benefits to insurance providers and insurance customers, such as to lessen the amount of damage that results from insurance-related events, such as vehicle accidents, etc. Emergency responders may arrive on the scene of an insurance-related event quicker, and thus take prompt action to lessen damage. The functionality described herein may be used to adjust or update insurance policies, such as adjust or update insurance premiums, rates, discounts, risk levels, etc. associated with auto insurance based upon an insured having one or more of the functionalities or capabilities discussed herein.

Exemplary System for Automatically Generating a Police Report

Figure 1:
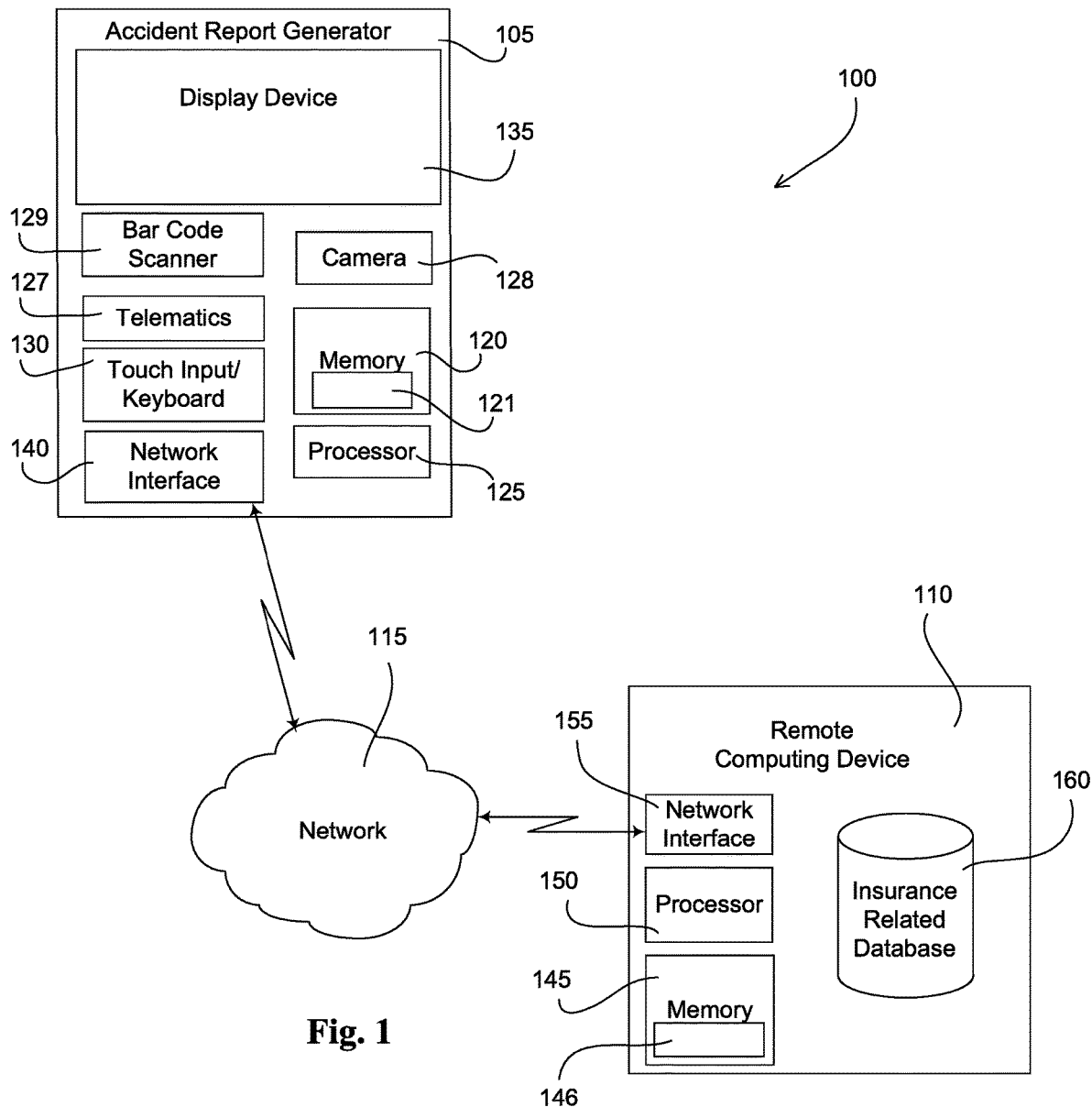
FIG. 1 depicts a high-level block diagram for an exemplary computer system for automatically generating a police report.

Turning to FIG. 1, a computer system for automatically generating police reports 100 may include a police report data generation device 105 in communication with a remote computing device 110 via a communications network 115. The computer system 100 may implement communications between the police report data generation device 105 and the remote computing device 110 to provide, for example, police report data to an insurance database 160. For example, the computer system 100 may acquire insurance policy data, vehicle identification data, vehicle driver identification data, vehicle telematics data, and/or accident scene reconstruction data from, for example, a user of a police report generation device 105. As described in detail herein, the computer system 100 may automatically generate police report data based upon, for example, the insurance policy data, vehicle identification data, vehicle driver identification data, vehicle telematics data, and/or accident scene reconstruction data. The computer system 100 may automatically generate a police report based upon the police report data.

For clarity, only one police report data generation device 105 and one remote computing device 110 are depicted in FIG. 1. While FIG. 1 depicts only one police report data generation device 105 and one remote computing device 110, it should be understood that any number of police report data generation devices 105 and any number of remote computing devices may be supported, and that each police report data generation device 105 and each remote computing device 110 may be any appropriate computing device, such as a mobile telephone, a personal data assistant, a tablet or a lap-top computer.

A police report data generation device 105 may include a memory 120 and a processor 125 for storing and executing, respectively, a module 121. The module 121, stored in the memory 120 as a set of computer-readable instructions, may be related to an application for automatically generating police report data that, when executed on processor 125, may cause the processor 125 to generate police report data based upon insurance policy data, vehicle identification data, vehicle driver identification data, vehicle telematics data, and/or accident scene reconstruction data. As described in detail herein, the module 121 may facilitate interaction between an associated police report data generation device 105 and a remote computing device 110. The processor 125, further executing the module 121, may facilitate communications between a remote computing device 110 and a police report data generation device 105 via a network interface 140 and a network 215.

A police report data generation device 105 may include a telematics device 127, a camera 128, and a bar code scanner 129. A police report data generation device 105 may include a display device 135 which may be any type of electronic display device such as a liquid crystal display (LCD), a light emitting diode (LED) display, a plasma display, a cathode ray tube (CRT) display, or any other type of known or suitable electronic display. A display device 135 may exhibit a display which depicts a user interface for configuring police report data generation device 105 to communicate with a remote computing device 110. A police report data generation device 105 may include a user input device 130, such as a touch input/keyboard/pointing device (e.g., a mouse) that provides a mechanism for a user of the police report data generation device 105 to launch an automatic police report generation application and, for example, to interact with a system for automatically generating police reports. The user input device 130 may be configured as an integral part of a display device 135, such as a touch screen display device.

The network interface 140 may be configured to facilitate communications between a police report data generation device 105 and a remote computing device 110 via any wireless communication network 115, including for example a peer-to-peer communications link, wireless LAN, MAN or WAN, WiFi, the Internet, or any combination thereof. Moreover, a police report data generation device 105 may be communicatively connected to a remote computing device 110 via any suitable communication system, such as via any publicly available or privately owned communication network, including those that use wireless communication structures, such as wireless communication networks, including for example, a peer-to-peer communications link, wireless LANs and WANs, satellite and cellular telephone communication systems, etc. A police report data generation device 105 may cause, for example, police report data to be transmitted to, and stored in, for example, a remote computing device 110 memory 145 and/or a remote insurance database 160.

A remote computing device 110 may include a memory 145 and a processor 150 for storing and executing, respectively, a module 146. The module 146, stored in the memory 145 as a set of computer-readable instructions, may facilitate applications related to automatically generating police reports based upon, for example, police report data. The module 146 may also facilitate communications between the remote computing device 110 and a police report data generation device 105 via a network interface 155 and the network 115, and other functions and instructions.

A remote computing device 110 may be communicatively coupled to an insurance database 160. While the insurance database 160 is shown in FIG. 1 as being communicatively coupled to the remote computing device 110, it should be understood that the insurance database 160 may be located within separate remote servers (or any other suitable computing devices) communicatively coupled to the remote computing device 110. Optionally, portions of insurance database 160 may be associated with memory modules that are separate from one another, such as a memory 120 of a police report data generation device 105.

Figure 2:
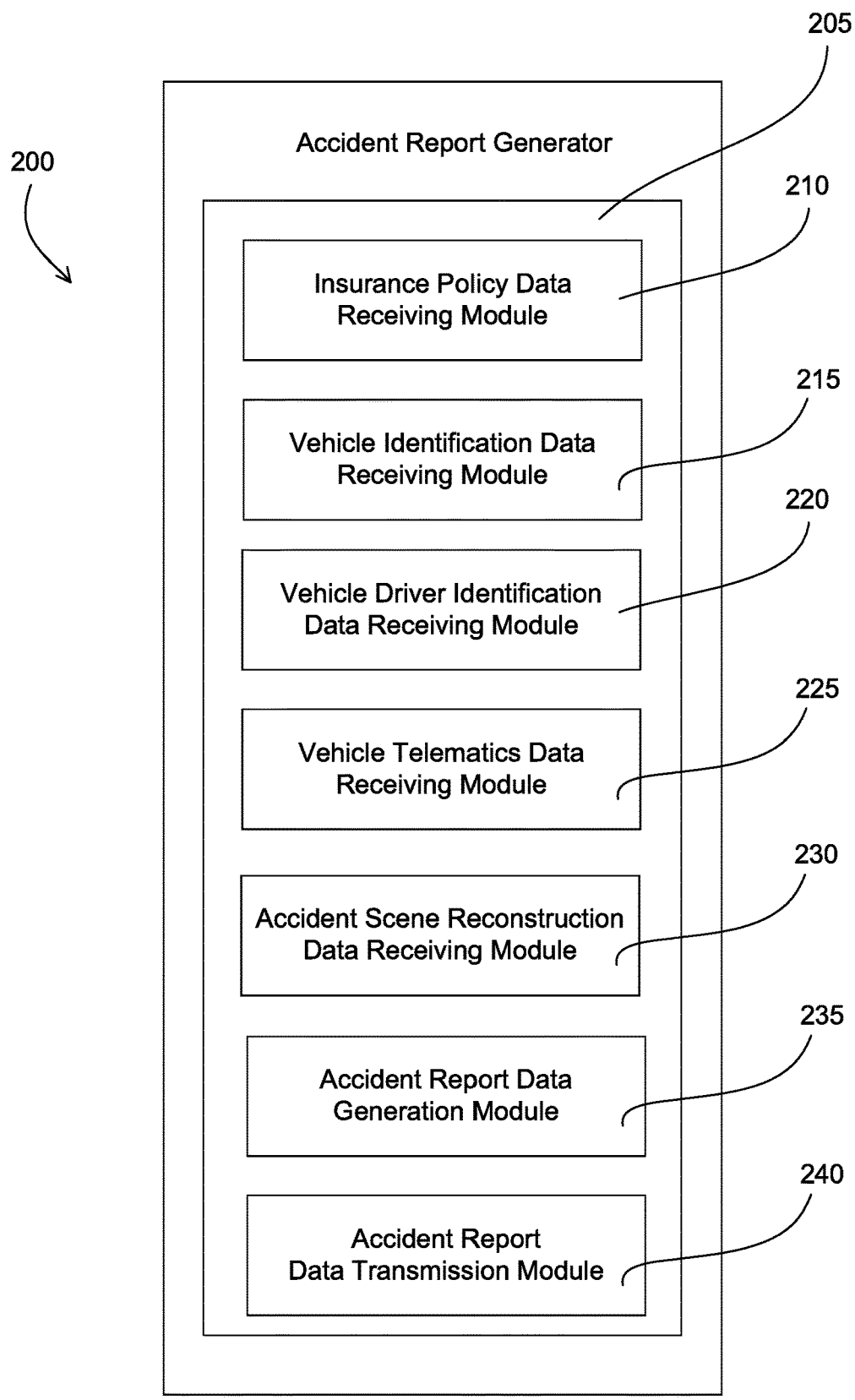
FIG. 2 depicts a block diagram for an exemplary police report generation device for automatically generating a police report.

Exemplary Police Report Generation Device for Automatically Generating a Police Report Turning to FIG. 2, a police report data generation device 200 may include an insurance policy data receiving module 210, a vehicle identification data receiving module 215, a vehicle driver identification data receiving module 220, a vehicle telematics data receiving module 225, an accident scene reconstruction data receiving module 230, an accident report data generation module 235, and/or an accident report data transmission module 240 stored on, for example, a memory 205. The police report data generation device 200 may be similar to the police report data generation device 105 of FIG. 1, and/or may include additional, less, or alternate functionality, including that discussed elsewhere herein.

Exemplary Remote Computing Device for Automatically Generating a Police Report

Figure 3:
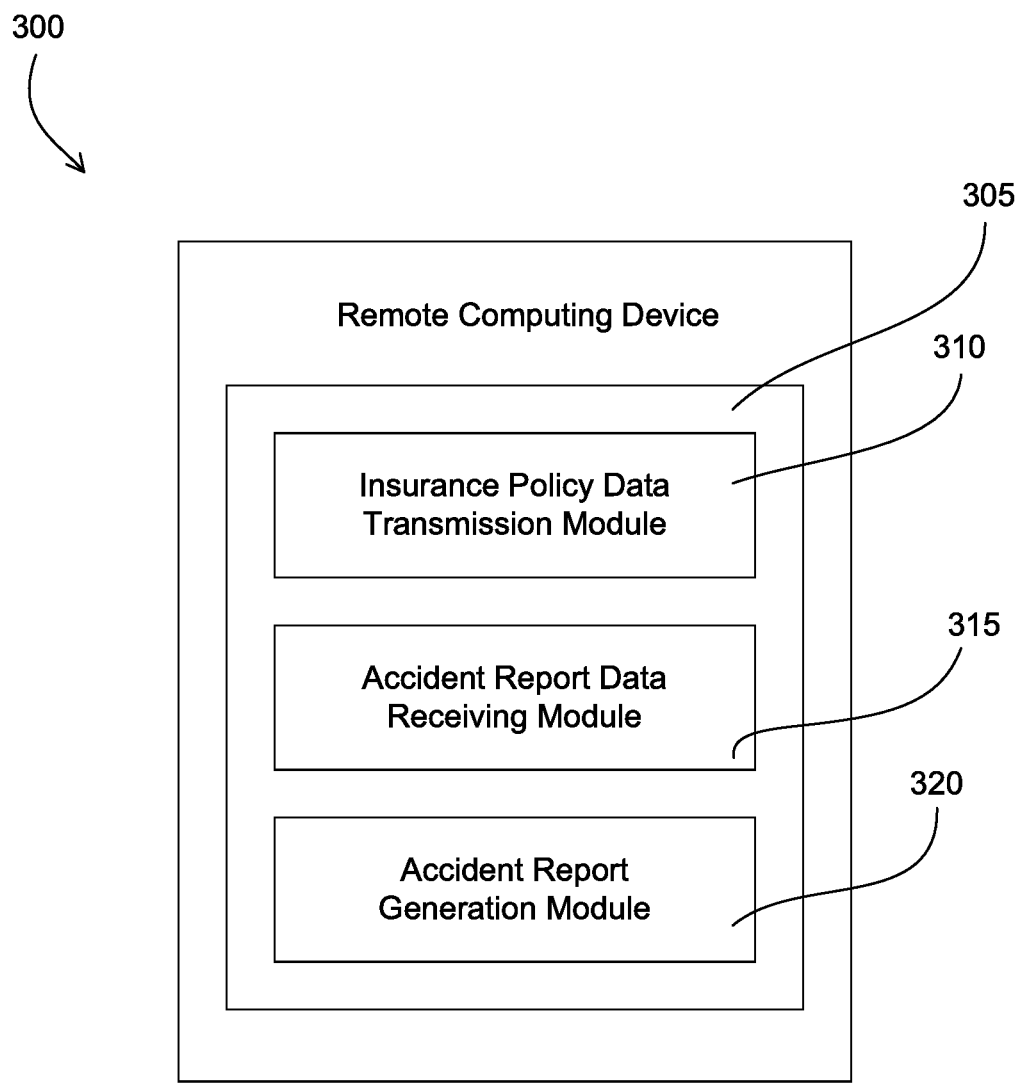
FIG. 3 depicts a block diagram for a remote computing device for automatically generating a police report.

With reference to FIG. 3, a remote computing device 300 may include an insurance policy data transmission module 310, a police report data receiving module 315, and/or a police report generation module 320 stored on, for example, a memory 305. The remote computing device 300 may be similar to, for example, the remote computing device 110 of FIG. 1, and/or may include additional, less, or alternate functionality, including that discussed elsewhere herein.

Exemplary Method for Automatically Generating a Police Report

Figure 4:
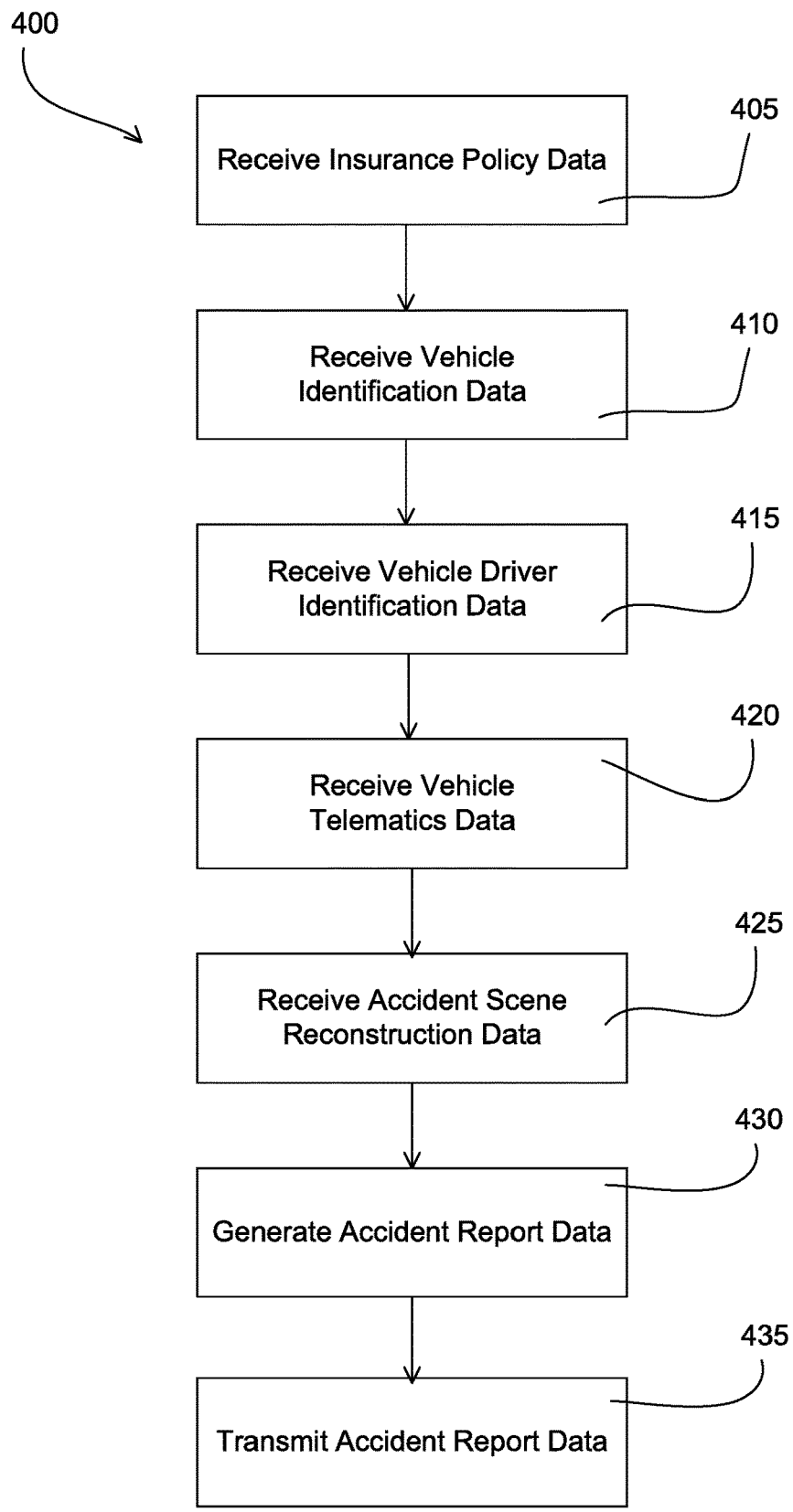
FIG. 4 depicts a flow diagram for an exemplary method for automatically generating a police report.

Turning to FIG. 4, a method of automatically generating police report data 400 may be implemented by a processor (e.g., processor 125 of police report data generation device 105 of FIG. 1) executing, for example, modules 210-240 of FIG. 2. In particular, processor 125 may execute an insurance policy data receiving module 210 to receive insurance policy data from, for example, a processor of a remote computing device (e.g., processor 150) (block 405). The processor 125 may execute a vehicle identification data receiving module 215 to cause the processor 125 to receive vehicle identification data from, for example, a scanning device (e.g., scanning device 129 of FIG. 1) in response to, for example, scanning a vehicle identification number (block 410). The processor 125 may execute a vehicle driver identification data receiving module 220 to, for example, cause the processor 125 to receive vehicle driver identification data from, for example, a scanning device (e.g., scanning device 129 of FIG. 1) in response to, for example, scanning a license of a driver (block 415).

The processor 125 may execute a vehicle telematics data receiving module 225 to, for example, cause the processor 125 to receive vehicle telematics data from, for example, a vehicle telematics device (e.g., telematics device 127 of FIG. 1) (block 420). The vehicle telematics data may be representative of, for example, an impact of a collision, a time of a collision, and/or a location of a collision. The processor 125 may execute an accident scene reconstruction data receiving module 230 to, for example, cause the processor 125 to receive accident scene reconstruction data from, for example, a satellite image database (e.g., insurance database 160 of FIG. 1), a video of the scene or images of the scene (e.g., a video or images acquired from camera 128 of FIG. 1), a weather database (e.g., insurance database 160 of FIG. 1), and/or telematics system of another vehicle (e.g., telematics device 127 of FIG. 1) (block 425).

The processor 125 may execute an accident report data generation module 235 to, for example, cause the processor 125 to generate police report data based upon, for example, insurance policy data, vehicle identification data, vehicle driver identification data, vehicle telematics data, and/or accident scene reconstruction data (block 430). Additionally, or alternatively, the processor 125 may execute an accident report data transmission module 240 to, for example, cause the processor 125 to transmit police report data to, for example, a remote computing device (e.g., remote computing device 110 of FIG. 100) (block 430). The method 400 may include additional, fewer, or alternate actions, including those discussed elsewhere herein.

Exemplary Method for Automatically Generating a Police Report

Figure 5:
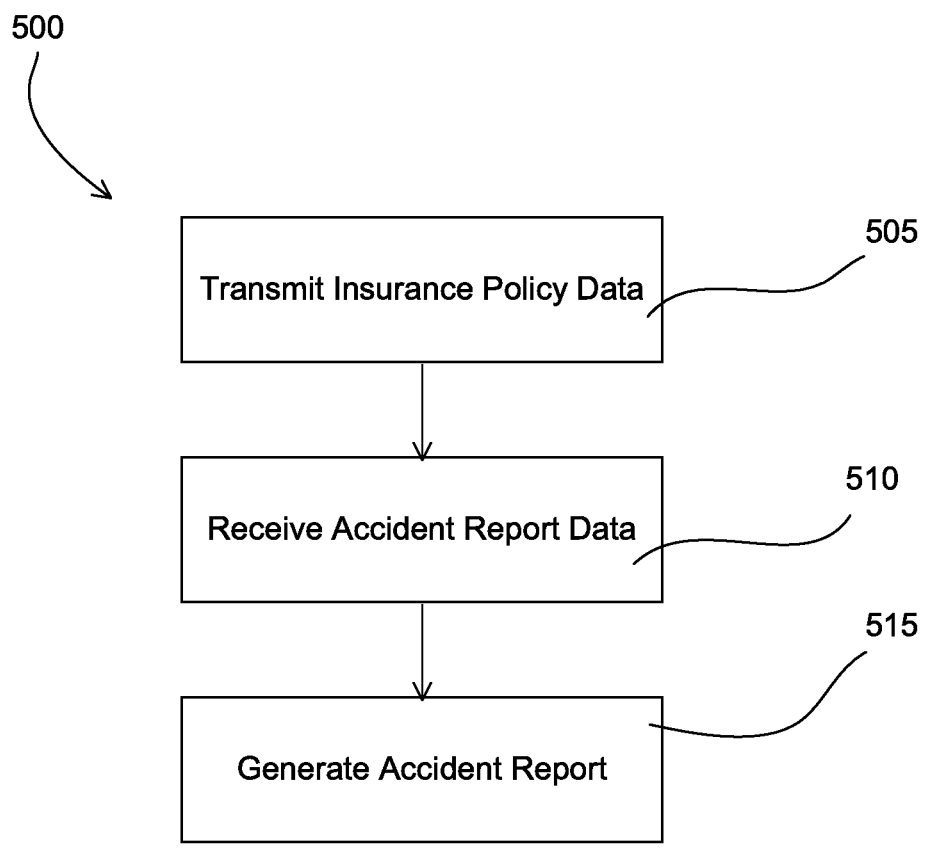
FIG. 5 depicts a flow diagram for an exemplary method for automatically generating a police report.

With reference to FIG. 5, a method of automatically generating a police report 500 may be implemented by a processor (e.g., processor 150 of remote computing device 110 of FIG. 1) executing, for example, modules 310-320 of FIG. 3. In particular, processor 150 may execute an insurance policy data transmission module 310 to insurance policy data to, for example, a processor of a police report data generation device (e.g., processor 125 of FIG. 1) (block 505). The processor 150 may execute an accident report data receiving module 315 to, for example, cause the processor 150 to receive accident report data from, for example, a police report data generation device (e.g., police report data generation device 105 of FIG. 1) (block 510). The processor 150 may execute an accident report generation module 315 to, for example, cause the processor 150 to generate a police report based upon, for example, the police report data (block 515). The method 500 may include additional, fewer, or alternate actions, including those discussed elsewhere herein.

Exemplary Computer Implemented Method

In one aspect, a computer implemented method for automatically generating a police report may include receiving insurance policy data, at a processor of a computing device, in response to the processor executing an insurance policy data receiving module. The insurance policy data may be representative of a vehicle insurance policy. The method may also include receiving vehicle identification data, at a processor of a computing device, in response to the processor executing a vehicle identification data receiving module. The vehicle identification data may be representative of at least one vehicle. The method may further include receiving vehicle driver identification data, at a processor of a computing device, in response to the processor executing a vehicle driver identification data receiving module. The vehicle driver identification data is representative of a vehicle driver. The method may yet further include automatically generating police report data, using a processor of a computing device, based upon the insurance policy data, the vehicle identification data, and the vehicle driver identification data, in response to the processor executing a police report data generation module.

The computer implemented method for automatically generating a police report may include receiving vehicle telematics data, at a processor of a computing device, in response to the processor executing a vehicle telematics data receiving module. The vehicle telematics data may be representative of at least one of: an impact of a collision, a time of a collision, or a location of a collision, and wherein the police report data is further based upon the vehicle telematics data. A computer implemented method for automatically generating a police report may include receiving accident scene reconstruction data, at a processor of a computing device, in response to the processor executing an accident scene reconstruction data receiving module. The accident scene reconstruction data may be representative of a scene of a vehicle accident, and wherein the police report data is further based upon the accident scene reconstruction data. A computer implemented method for automatically generating a police report may include transmitting, using the processor of the computing device, police report data to a processor of a remote computing device. A computer implemented method for automatically generating a police report may include automatically generating, using the processor of the remote computing device, a police report in response to receiving police report data in response to the processor of the remote computing device executing a police report generation module.

Exemplary Device

A device for automatically generating a police report may include an insurance policy data receiving module stored on a memory that, when executed by a processor of a computing device, causes the processor to receive insurance policy data. The insurance policy data may be representative of a vehicle insurance policy. The device may also include a vehicle identification data receiving module stored on a memory that, when executed by a processor of a computing device, causes the processor to receive vehicle identification data. The vehicle identification data may be representative of at least one vehicle. The device may further include a vehicle driver identification data receiving module stored on a memory that, when executed by a processor of a computing device, causes the processor to receive vehicle driver identification data. The vehicle driver identification data may be representative of a vehicle driver. The device may yet further include a police report data generation module stored on a memory that, when executed by a processor of a computing device, causes the processor to automatically generate police report data, based upon the insurance policy data, the vehicle identification data, and the vehicle driver identification data.

For instance, the device for automatically generating a police report may include a vehicle telematics data receiving module stored on a memory that, when executed by a processor of a computing device, causes the processor to receive vehicle telematics data. The vehicle telematics data may be representative of at least one of: an impact of a collision, a time of a collision, or a location of a collision, and the police report data may be further based upon the vehicle telematics data. A device for automatically generating a police report may include an accident scene reconstruction data receiving module stored on a memory that, when executed by a processor of a computing device, causes the processor to receive accident scene reconstruction data. The accident scene reconstruction data is representative of a scene of a vehicle accident, and the police report data may be further based upon the accident scene reconstruction data. A device for automatically generating a police report may include a police report data transmission module stored on a memory that, when executed by a processor of a computing device, causes the processor to transmit the police report data to a processor of a remote computing device. The insurance policy data may be received from a processor of a remote computing device. The vehicle identification data may be received from a processor of a scanning device in response to scanning a vehicle identification number. The vehicle driver identification data may be received from a processor of a scanning device in response to scanning a license of the vehicle driver.

Exemplary Computer-Readable Instructions

A non-transitory computer-readable medium storing instructions that, when executed by a processor of a computing device, causes the processor to automatically generate police report data may include an insurance policy data receiving module that, when executed by a processor of a computing device, causes the processor to receive insurance policy data. The insurance policy data may be representative of a vehicle insurance policy. The non-transitory computer-readable medium may also include a vehicle identification data receiving module that, when executed by a processor of a computing device, causes the processor to receive vehicle identification data. The vehicle identification data may be representative of at least one vehicle. The non-transitory computer-readable medium may further include a vehicle driver identification data receiving module that, when executed by a processor of a computing device, causes the processor to receive vehicle driver identification data. The vehicle driver identification data may be representative of a vehicle driver. The non-transitory computer-readable medium may yet further include a police report data generation module that, when executed by a processor of a computing device, causes the processor to automatically generate police report data, based upon the insurance policy data, the vehicle identification data, and the vehicle driver identification data.

The non-transitory computer-readable medium storing instructions that, when executed by a processor of a computing device, causes the processor to automatically generate police report data may include a vehicle telematics data receiving module that, when executed by a processor of a computing device, causes the processor to receive vehicle telematics data. The vehicle telematics data may be representative of at least one of: an impact of a collision, a time of a collision, or a location of a collision, and the police report data may be further based upon the vehicle telematics data. A non-transitory computer-readable medium storing instructions that, when executed by a processor of a computing device, causes the processor to automatically generate police report data may include an accident scene reconstruction data receiving module that, when executed by a processor of a computing device, causes the processor to receive accident scene reconstruction data. The accident scene reconstruction data may be representative of a scene of a vehicle accident, and the police report data may be further based upon the accident scene reconstruction data. A non-transitory computer-readable medium storing instructions that, when executed by a processor of a computing device, causes the processor to automatically generate police report data may include a police report data transmission module that, when executed by a processor of a computing device, causes the processor to transmit police report data to a processor of a remote computing device. A non-transitory computer-readable medium storing instructions that, when executed by a processor of a computing device, causes the processor to automatically generate police report data may include a police report generation module that, when executed by the processor of the remote computing device, may cause the processor of the remote computing device to automatically generate a police report in response to receiving police report data. The insurance policy data may be received from a processor of a remote computing device. The vehicle identification data may be received from a processor of a scanning device in response to scanning a vehicle identification number. The vehicle driver identification data may be received from a processor of a scanning device in response to scanning a license of the vehicle driver.

Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A device for automatically generating a police report, the device comprising:
    an insurance policy data receiving module stored on a memory that, when executed by a processor of a computing device, causes the processor to receive insurance policy data, wherein the insurance policy data is representative of a vehicle insurance policy, wherein the insurance policy data is received from a processor of a remote computing device, and wherein the insurance policy data includes an indication as to whether at least one vehicle is equipped with an automatic police report generation device;
    a vehicle identification data receiving module stored on a memory that, when executed by a processor of a computing device, causes the processor to receive vehicle identification data, wherein the vehicle identification data is representative of the at least one vehicle and an association of the at least one vehicle with the insurance policy;
    a vehicle driver identification data receiving module stored on a memory that, when executed by a processor of a computing device, causes the processor to receive vehicle driver identification data, wherein the vehicle driver identification data is representative of a vehicle driver and an association of the vehicle driver with the insurance policy; and
    a police report data generation module stored on a memory that, when executed by a processor of a computing device, causes the processor to automatically generate police report data, based upon the insurance policy data, the vehicle identification data, and the vehicle driver identification data.

2. The device of claim 1, further comprising:
    a vehicle telematics data receiving module stored on a memory that, when executed by a processor of a computing device, causes the processor to receive vehicle telematics data, wherein the vehicle telematics data is representative of an impact of a collision, and wherein the police report data is further based upon the vehicle telematics data.

3. The device of claim 1, further comprising:
    a satellite video data receiving module stored on a memory that, when executed by a processor of a computing device, causes the processor to receive satellite video data, wherein the satellite video data is representative of images acquired by a camera attached to a satellite; and an accident scene reconstruction data receiving module stored on a memory that, when executed by a processor of a computing device, causes the processor to receive accident scene reconstruction data, wherein the accident scene reconstruction data is representative of a scene of a vehicle accident, and wherein the police report data is further based upon the satellite video data and the accident scene reconstruction data.

4. The device of claim 1, further comprising:

a vehicle-to-vehicle data transmission module stored on a memory that, when executed by a processor of a computing device, causes the processor to receive vehicle-to-vehicle data communicated vehicle-to-vehicle from another vehicle; and a police report data transmission module stored on a memory that, when executed by a processor of a computing device, causes the processor to transmit the vehicle-to-vehicle data and the police report data to the processor of the remote computing device.

5. The device of claim 1, wherein the vehicle identification data is received from a processor of a scanning device in response to scanning a vehicle identification number.

6. The device of claim 1, wherein the vehicle driver identification data is received from a processor of a scanning device in response to scanning a license number of the vehicle driver.

7. A computer implemented method for automatically generating a police report, the method comprising:

receiving insurance policy data, at a processor of a computing device, in response to the processor executing an insurance policy data receiving module, wherein the insurance policy data is representative of a vehicle insurance policy, wherein the insurance policy data is received from a processor of a remote computing device, and wherein the insurance policy data includes an indication as to whether at least one vehicle is equipped with an automatic police report generation device;

receiving vehicle identification data, at a processor of a computing device, in response to the processor executing a vehicle identification data receiving module, wherein the vehicle identification data is representative of the at least one vehicle and an association of the at least one vehicle with the insurance policy;

receiving vehicle driver identification data, at a processor of a computing device, in response to the processor executing a vehicle driver identification data receiving module, wherein the vehicle driver identification data is representative of a vehicle driver and an association of the vehicle driver with the insurance policy; and automatically generating police report data, using a processor of a computing device, based upon the insurance policy data, the vehicle identification data, and the vehicle driver identification data, in response to the processor executing a police report data generation module.

8. The method of claim 7, further comprising:

receiving vehicle telematics data, at a processor of a computing device, in response to the processor executing a vehicle telematics data receiving module, wherein the vehicle telematics data is representative of an impact of a collision, and wherein the police report data is further based upon the vehicle telematics data.

9. The method of claim 7, further comprising:

receiving satellite video data, at a processor of a computing device, in response to the processor executing a satellite video data receiving module, wherein the satellite video data is representative of images acquired by a camera attached to a satellite; and receiving accident scene reconstruction data, at a processor of a computing device, in response to the processor executing an accident scene reconstruction data receiving module, wherein the accident scene reconstruction data is representative of a scene of a vehicle accident, and wherein the police report data is further based upon the satellite video data and the accident scene reconstruction data.

10. The method of claim 7, further comprising:

transmitting, using the processor of the computing device, the police report data to the processor of the remote computing device.

11. The method of claim 10, further comprising:

receiving vehicle-to-vehicle data, at a processor of a computing device, communicated vehicle-to-vehicle from another vehicle, in response to the processor executing a vehicle-to-vehicle data transmission module; and automatically generating, using the processor of the remote computing device, a police report in response to receiving the vehicle-to-vehicle data and the police report data in response to the processor of the remote computing device executing a police report generation module.

12. A non-transitory computer-readable medium storing instructions that, when executed by a processor of a computing device, causes the processor to automatically generate police report data, the non-transitory computer-readable medium comprising:

an insurance policy data receiving module that, when executed by a processor of a computing device, causes the processor to receive insurance policy data, wherein the insurance policy data is representative of a vehicle insurance policy, wherein the insurance policy data is received from a processor of a remote computing device, and wherein the insurance policy data includes an indication as to whether at least one vehicle is equipped with an automatic police report generation device;

a vehicle identification data receiving module that, when executed by a processor of a computing device, causes the processor to receive vehicle identification data, wherein the vehicle identification data is representative of the at least one vehicle and an association of the at least one vehicle with the insurance policy;

a vehicle driver identification data receiving module that, when executed by a processor of a computing device, causes the processor to receive vehicle driver identification data, wherein the vehicle driver identification data is representative of a vehicle driver and an association of the vehicle driver with the insurance policy; and a police report data generation module that, when executed by a processor of a computing device, causes the processor to automatically generate police report data, based upon the insurance policy data, the vehicle identification data, and the vehicle driver identification data.

13. The non-transitory computer-readable medium of claim 12, further comprising:
a vehicle telematics data receiving module that, when executed by a processor of a computing device, causes the processor to receive vehicle telematics data, wherein the vehicle telematics data is representative of an impact of a collision, and wherein the police report data is further based upon the vehicle telematics data.

14. The non-transitory computer-readable medium of claim 12, further comprising:
a satellite video data receiving module that, when executed by a processor of a computing device, causes the processor to receive satellite video data, wherein the satellite video data is representative of images acquired by a camera attached to a satellite; and
an accident scene reconstruction data receiving module that, when executed by a processor of a computing device, causes the processor to receive accident scene reconstruction data, wherein the accident scene reconstruction data is representative of a scene of a vehicle accident, and wherein the police report data is further based upon the satellite video data and the accident scene reconstruction data.

15. The non-transitory computer-readable medium of claim 12, further comprising:
a police report data transmission module that, when executed by a processor of a computing device, causes the processor to transmit the police report data to the processor of the remote computing device.

16. The non-transitory computer-readable medium of claim 15, further comprising:
a vehicle-to-vehicle data transmission module that, when executed by a processor of a computing device, causes the processor to receive vehicle-to-vehicle data communicated vehicle-to-vehicle from another vehicle; and
a police report generation module that, when executed by the processor of the remote computing device, causes the processor of the remote computing device to automatically generate a police report in response to receiving the vehicle-to-vehicle data and the police report data.

17. The non-transitory computer-readable medium of claim 12, wherein the vehicle identification data is received from a processor of a scanning device in response to scanning a vehicle identification number.

18. The non-transitory computer-readable medium of claim 12, wherein the vehicle driver identification data is received from a processor of a scanning device in response to scanning a license number of the vehicle driver.

* * * * *